United States Patent [19]
Pinke et al.

[11] 3,853,887
[45] Dec. 10, 1974

[54] CYCLIALKYLATION OF AMINES

[75] Inventors: Paul A. Pinke, Des Plaines; Stephen N. Massie, Palatine, both of Ill.

[73] Assignee: Universal Oil Products Company, Des Plaines, Ill.

[22] Filed: Mar. 9, 1973

[21] Appl. No.: 339,818

[52] U.S. Cl... 260/293.64, 260/293.79, 260/326.85, 260/326.8, 260/326.47
[51] Int. Cl............................................ C07d 29/28
[58] Field of Search....... 260/293.64, 326.85, 326.8, 260/293.72, 293.79, 326.47

[56] References Cited
FOREIGN PATENTS OR APPLICATIONS
876,068    7/1942    France........................... 260/293.51

OTHER PUBLICATIONS
C. A. 70: 68133 w (1969), Kawaguchi et al.
Canad. J. Chem. 30: 1–8 (1952), Bourns et al.
J. Chem. Soc. (1948) 267–272, Feachem et al.
C. A. 45: 5680 b (1951), Yur'ev et al.
C. A. 33: 6303 4 (1939), Yur'ev et al.

Primary Examiner—Henry R. Jiles
Assistant Examiner—S. D. Winters
Attorney, Agent, or Firm—James R. Hoatson, Jr.; Raymond H. Nelson; William H. Page, II

[57] ABSTRACT

A process for the preparation of a heterocyclic nitrogen compound which comprises the cyclialkylation of a primary amine by treatment with a heterocyclic oxygen compound in the presence of an acid-acting catalyst.

9 Claims, No Drawings

CYCLIALKYLATION OF AMINES

This invention relates to a process for preparing a heterocyclic nitrogen compound. More specifically, this invention relates to a process for the preparation of a heterocyclic nitrogen compound which comprises cyclialkylating a primary amine by treatment with a heterocyclic oxygen compound in the presence of an acid-acting catalyst.

It has been shown in the prior art that an amine or ammonia may be cyclialkylated by a heterocyclic oxygen compound by passage over a non-metallic catalyst such as alumina at about 400° C. to form a heterocyclic nitrogen compound such as pyrrolidine or N-aryl-substitued pyrrolidines. It has also been shown that the cyclialkylation can be effected thermally at temperatures in the range of about 700° C.

In contradistinction to the prior art it has now been discovered that a heterocyclic nitrogen compound may be prepared by the cyclialkylation of a primary amine by treatment with a heterocyclic oxygen compound in the presence of an acid-acting catalyst and recovering the resultant heterocyclic nitrogen compound. The utilization of the above recited invention will allow the manufacturer to increase his percentage yield of the heterocyclic nitrogen compound plus enhance the quantity of nitrogen substitutions as a result of the increase in the control of the cyclialkylation reaction. The present invention will also decrease the cost of production of the heterocyclic nitrogen compound as a consequence of the elimination of expensive heat producing equipment no longer needed as a result of the decrease in the quantity of heat that will be necessary to effect the reaction.

The desired products of this invention, namely, the heterocyclic nitrogen compounds are utilized in the chemical industry in many ways. Some of the ways these heterocyclic nitrogen compounds are used are exemplified by the use of pyrrolidine as an insecticide, as a rubber accelerator, for citrus decay control, as a catalyst for the epoxy resin, as an inhibitor or as an intermediate in the production of pharmaceuticals; or the use of piperidine as a solvent and organic chemical intermediate or as an ingredient in oils and fuels; or the use of 4,4'-bis-(N-piperidinyl)-diphenylmethane and 4,4'-bis-(N-pyrrolidinyl)diphenylmethane as catalysts in the preparation of organic copolymers or as antioxidants in gasoline.

It is therefore an object of this invention to provide a process for the preparation of a heterocyclic nitrogen compound.

A further object of this invention is to provide a process for the preparation of a heterocyclic nitrogen compound by the cyclialkylation of an amine with a heterocyclic oxygenated compound in the presence of certain catalytic compositions of matter which will permit the recovery of the desired products.

In one aspect an embodiment of this invention resides in a process for the preparation of a heterocyclic nitrogen compound which comprises the cyclialkylating of a primary amine by treatment with a heterocyclic oxygen compound in the presence of an acid-acting catalyst at reaction conditions, and recovering the resultant heterocyclic nitrogen compound.

A specific embodiment of this invention resides in a process for preparing a heterocyclic nitrogen compound which comprises cyclialkylating n-butylamine by treatment with tetrahydrofuran in the presence of cobalt-molybdenum on a silica-alumina support at a temperature in the range of from about 125° to about 250° C. and a pressure in the range of from about 5 atmospheres to about 150 atmospheres and recovering the resultant N-n-butylpyrrolidine.

Another specific embodiment of this invention resides in a process for preparing a heterocyclic nitrogen compound which comprises cyclialkylating methylenedianiline by treatment with tetrahydrofuran in the presence of an iridium catalyst on a chlorided silica support at about 150° C. and elevated pressure and recovering the resultant 4,4'-bis-(N-pyrrolidinyl)methylenedianiline and 4-amino-4'-(N-pyrrolidinyl)-diphenylmethane.

Other objects and embodiments will be found in the following further detailed description of the present invention.

As herein set forth the present invention is concerned with a process for preparing a heterocyclic nitrogen compound, said process being effected by cyclialkylating a primary amine by treatment with a heterocyclic oxygen compound in the presence of certain catalytic compositions of matter. The reaction is effected under a reaction condition which includes an elevated temperature in the range of from about 50° C. to about 300° C. and preferably in a range of from about 100° C. to about 200° C. In addition, another reaction condition involves pressure, said pressure ranging from about atmospheric up to about 200 atmospheres or more. When superatmospheric pressures are employed, said pressure is afforded by the introduction of a substantially inert gas such as nitrogen, helium or argon into the reaction zone, the particular pressure which is used being that which is necessary to maintain a major portion of the reactants in the liquid phase.

The catalytic compositions of matter which are used in the process of this invention comprise a catalyst which is acid-acting in nature. Acid-acting catalysts which are contemplated within the scope of this invention include those which may be introduced in an aqueous form, in a combined form such as a salt of the charged amine or supported upon a heterogeneous support. Examples of suitable acid-acting catalysts contemplated within the scope of this invention would include hydrochloric acid, sulfuric acid, hydrogen fluoride, hydrogen bromide, hydrogen iodide, anhydrous hydrochloric acid, anhydrous sulfuric acid, anhydrous hydrogen bromide, anhydrous hydrogen iodide, aniline hydrogen chloride, aniline hydrogen bromide, 2-methylaniline hydrogen chloride, n-butyl amine hydrogen chloride, sulfonic acid substituted upon a divinylbenzene-styrene copolymer resin, and zeolitic compositions such as crystalline aluminosilicates as exemplified by faujasite or mordenite.

In a preferred embodiment of the present invention it is found that the acid-acting catalyst also encompasses a catalyst comprising a metal selected from Group VIII of the Periodic Table on a heterogeneous inorganic oxide support. Examples of suitable Group VIII metals from the Periodic Table would include iron, cobalt, nickel, ruthenium, rhodium, palladium, osmium, iridium and platinum.

Suitable examples of heterogeneous inorganic oxide supports which may be utilized for support of metals or acids include alumina, silica, magnesia, thoria, zirconia, alumina-silica, alumina-magnesia, alumina-silicamagnesia, magnesia-thoria, silica-magnesia-zirconia, or any mixture thereof.

In another preferred embodiment of the present invention, it is found that a catalyst comprising the Group VIII metal on a heterogeneous inorganic support may be enhanced by the addition of a metal selected from Group VIB or Group VIIB of the Periodic Table. Suitable examples of metals which may be selected from Group VIB of the Periodic Table would include chromium, molybdenum and tungsten, while suitable examples of metals which may be selected from Group VIIB of the Periodic Table would include manganese and rhenium.

In yet another preferred embodiment of the present invention, it is found that the catalytic activity of the catalyst comprising a metal selected from Group VIII of the Periodic Table on an inorganic support, coupled with metals selected from Groups VIB or VIIB of the Periodic Table, if so desired, will be magnified by treatment of the heterogeneous inorganic oxide by a haliding agent. Suitable examples of haliding agents would include hydrogen chloride, hydrogen bromide, hydrogen iodide and hydrogen fluoride.

It is understood that the aforementioned acid-acting catalysts, Group VIII, Group VIB, Group VIIB, inorganic oxide supports and haliding agents are only representative of the class of compounds which may be employed and that the present invention is not necessarily limited thereto.

Examples of suitable primary amines which may be utilized as one of the starting materials in the process of this invention include primary monoamines or primary polyamines as in accordance with the set forth structures:

where $R_1$ is hydrogen, alkyl, hydroxyalkyl, aryl, diaryl, carboxyalkyl, alkene, alkylene or alkylaryl radicals;

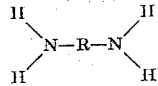

where R is an alkyl, aryl, diaryl, diarylalkyl, alkene, allylene or alkylaryl radical. Examples of suitable starting materials in accordance with the above promulgated structures include ammonia, methylamine, ethylamine, propylamine, heptylamine, octylamine, nonylamine, aniline, 2-methylaniline, 4-methylaniline, 2,4-dimethylaniline, 3-ethylaniline, 3,5-dipropylaniline, 2-methyl-3-ethyl-5-propylaniline, 3-chloroaniline, naphthylamine, 3-ethoxyaniline, 3,5-diethoxyaniline, vinylamine, allylamine, ethanolamine, p-tolylamine, o-tolylamine, ethylenediamine, trimethylenediamine, hexamethylenediamine, p-phenylenediamine, o-phenylenediamine, m-phenylenediamine, methyl-p-phenylenediamine, 2,4-diethyl-m-phenylenediamine, 1,5-naphthyldiamine, propylenediamine, 1,4-diamino-2-butene, methylenedianiline, bis(4-aminocyclohexyl)methane, etc.

Suitable heterocyclic oxygen compounds would include but are not limited to tetrahydrofuran, 2-methyltetrahydrofuran, 2,3-dimethyl tetrahydrofuran, 2-methyl-3-ethyltetrahydrofuran, 2-methoxytetrahydrofuran, 2-methoxy-3-ethoxytetrahydrofuran, 2-chlorotetrahydrofuran, 2,3-dichlorotetrahydrofuran, 2-bromotetrahydrofuran, 2-vinyltetrahydrofuran, 2,4-divinyltetrahydrofuran, 2-carboxylic acid tetrahydrofuran, 2,3-dicarboxylic acid tetrahydrofuran, 2-tolyltetrahydrofuran, 2,4-di-(3,5-xylyl)tetrahydrofuran, tetrahydropyran, 2-methyltetrahydropyran, 2,3-dimethyltetrahydropyran, 2-methyl-3-ethyltetrahydropyran, 2-methoxytetrahydropyran, 2-methoxy-3-ethoxytetrahydropyran, 2-chlorotetrahydropyran, 2,3-dichlorotetrahydropyran, 2-bromotetrahydropyran, 2-vinyltetrahydropyran, 2,4-divinyltetrahydropyran, 2-carboxylic acid tetrahydropyran, 2,3-dicarboxylic acid tetrahydropyran, 2-tolyltetrahydropyran, 2,4-di-p-xylyltetrahydropyran, etc. It is understood that the aforementioned primary amines and heterocyclic oxygen compounds are only representative of the class of compounds which may be employed and are not necessarily limited thereto.

The process of this invention may be effected in any suitable manner and may comprise either a batch or continuous type operation. For example, when a batch type operation is employed, the reactants comprising the primary amine and the heterocyclic oxygen compound are placed in an appropriate apparatus along with a viable catalyst as hereinbefore set forth. If atmospheric pressure is to be employed, the reaction vessel is then heated to a predetermined operating temperature and maintained thereat for a period of time which may range from 0.5 hours up to 50 hours or more at which time the heating is discontinued and the vessel allowed to return to room temperature. The reaction mixture is then recovered, separated from the catalyst, and subjected to conventional means of purification and separation, said means including washing, drying, filtration, extraction, evaporation, fractional distillation, etc. whereby the heterocyclic nitrogen compound is recovered. Alternatively, if superatmospheric pressures are to be employed in the reaction, the reactants are charged to the pressure vessel such as a rotating autoclave which contains a viable catalyst as hereinbefore set forth. The autoclave is sealed and a substantially inert gas such as nitrogen is pressed in until the desired operating pressure is reached. The autoclave is then heated to the desired operating temperature and maintained thereat for a predetermined residence time. At the end of this time, heating is discontinued, the autoclave is allowed to return to room temperature and the excess pressure is discharged. The autoclave is opened and the reaction mixture is then treated in a manner similar to that hereinbefore set forth whereby the desired products are separated and reovered.

It is also contemplated within the scope of this invention that the reaction process for obtaining the desired heterocyclic nitrogen compounds may be effected in a continuous manner of operation. When such a type of operation is employed, the reactants are continuously charged to the reaction vessel containing a viable catalyst as hereinbefore set forth, said vessel being maintained at the proper operating conditions of temperature and pressure. After completion of the desired residence time, the reactor effluent is continuously withdrawn and subjected to conventional means of separation whereby the desired heterocyclic nitrogen compound is recovered, while any unreacted starting materials comprising the heterocyclic oxygen compound and the primary amine are recycled to the reaction zone to form a portion of the feed stock. Inasmuch as the catalytic composition of matter may comprise a solid, various types of continuous operations may be used. One such type of operation comprises the fixed bed method in which the catalyst is disposed as a fixed bed in the reaction zone and the reactants are passed over said fixed bed in either an upward or downward flow. Another type of operation which may be employed comprises the moving bed type operation in which the catalyst is carried into the reaction zone as a slurry in either or both of the reactants. The mole ratio may also be varied depending upon the beginning reactants. When a diamine is utilized, it is found that the change in the mole ratio will have an effect on the percentage of heterocyclic nitrogen compounds formed in the resultant mixture.

Examples of heterocyclic nitrogen compounds which may be prepared according to the process of this invention will include pyrrolidine, N-ethylpyrrolidine, N-methyl-2-methylpyrrolidine, 4-amino-4'-(N-pyrrolidinyl)diphenylmethane, 4,4'-bis-(N-pyrrolidinyl)diphenylmethane, 4,4'-bis-(N-piperidinyl)diphenylmethane, 4,4'-bis-(N-pyrrolidinyl)diphenylethane, 4,4'-bis-(N-piperidinyl)diphenylpropane, 4,4'-bis-(N-pyrrolidinyl)diphenylbutane, 4,4'-bis-(N-piperidinyl)diphenylpentane, 4,4'-bis-(N-pyrrolidinyl)diphenylhexane, 2-(N-pyrrolidinyl)benzoic acid, di[N-(2-ethyl)pyrrolidinyl]benzene, N-propylpyrrolidine, N-butylpyrrolidine, 1,6-di[N-pyrrolidinyl]hexane, etc.

The following examples are given to illustrate the process of the present invention which, however, are not intended to limit the generally broad scope of the present invention in strict accordance therewith.

EXAMPLE I

To a rotating autoclave was added 9.9 grams of methylenedianiline and 70.6 grams of tetrahydrofuran along with a catalyst comprising 1% iridium on an alumina support. The rotating autoclave was equipped for effecting and maintaining heat and with pressure level determining devices. The rotating autoclave was heated to a temperature of 150° C. under 40 atmospheres initial nitrogen pressure and maintained thereat for 4 hours, after which time the rotating autoclave was allowed to return to room temperature. The product was recovered, separated from the catalyst by filtration and analyzed by means of gas chromatography instrumentation which disclosed the product to be a mixture of 4-amino-4'-(N-pyrrolidinyl)diphenylmethane, and 4,4'-bis-(N-pyrrolidinyl)diphenylmethane with a 97% conversion of the original reactant, methylenedianiline.

EXAMPLE II

In this experiment 96 grams of aniline and 144 grams of tetrahydrofuran were added to an autoclave equipped with heat and pressure attainment devices along with a catalyst comprising 2.5% cobalt and 9.0% molybdenum dispersed on an alumina support. After the autoclave had been charged with 100 atmospheres initial pressure of nitrogen, it was heated to a temperature of 250° C. and maintained thereat for a period of 8 hours. At the end of this period of time, the heating was terminated and the autoclave was allowed to return to room temperature and the pressure was then vented. The product was recovered, separated from the catalyst by filtration, and analyzed by means of gas-liquid chromatography, nuclear magnetic spectroscopy and infra-red spectroscopy which disclosed the product to be N-phenylpyrrolidine in a 17% yield and N-(4-hydroxybutyl)aniline in a 4% yield.

EXAMPLE III

In this example 16 grams of n-butylamine and 72 grams of tetrahydrofuran were added to an autoclave provided with heating and pressure regulating devices along with a catalyst comprising 2% nickel–14% molybdenum on a 37% silica–63% alumina support. The autoclave was heated to a temperature of 175° C. and an initial pressure of 20 atmospheres as afforded by the utilization of the admittance to the autoclave of substantially inert nitrogen and maintained thereat for a period of 4 hours. At the end of this time, the heating was discontinued and the autoclave was allowed to return to room temperature and ambient pressure. The product was separated from the catalyst by filtration and analyzed by means of nuclear magnetic resonance and infra-red spectroscopy instrumentation which disclosed the product to be N-n-butylpyrrolidine in about 12% yield calculated on the amount of n-butylamine charged.

EXAMPLE IV

In this example 0.5 grams of concentrated hydrochloric acid was dissolved in 72 grams of tetrahydrofuran and 5.0 grams of one-sixteenth inch alumina spheres were then added and stirred for 5 minutes. This solution and the alumina spheres were transferred to the liner of a rotating autoclave along with 41.5 grams of aniline. The autoclave was sealed, pressed with 100 atmospheres of nitrogen, and heated for 4 hours at 175° C. After the autoclave was allowed to cool, the pressure was vented, and the liquid product collected. Analysis of the product by gas-liquid chromatography demonstrated the presence of N-phenylpyrrolidine.

EXAMPLE V

In this example 93 grams of aniline and 116 grams of ethyl 2-tetrahydrofuroate are added to an autoclave equipped with heat and pressure devices along with a catalyst comprising 1% iridium and 2.0% rhenium on a silica support which has been chlorided by the addition of 1 weight % of hydrogen chloride. The autoclave is heated to a temperature of 160° C. and maintained at a pressure of 50 atmospheres for a period of 2 hours, at which time the autoclave is allowed to return to room temperature and ambient pressure. The product is recovered, separated from the catalyst by filtration and analyzed by means of nuclear magnetic resonance spectroscopy and infra-red spectroscopy instrumentation which discloses the product to contain ethyl N-phenylpyrrolidine-2-carboxylate.

EXAMPLE VI

In this experiment 108 grams of p-phenylenediamine and 200 grams of 2-ethyltetrahydrofuran are added to an autoclave which is equipped with heating and pressure devices along with a catalyst comprising 2% cobalt on an alumina support which is bromided by the addition of 1 weight % of hydrogen bromide. The autoclave is heated to a temperature of 185° C. and maintained at a pressure of 12 atmospheres for a period of 6 hours at which time the autoclave is allowed to return to room temperature and ambient pressure. The product is recovered, separated from the catalyst by filtration and analyzed by means of nuclear magnetic resonance spectroscopy and infra-red spectroscopy instrumentation which disclose the product to be a mixture of 1,4-bis-[N-(2-ethyl)-pyrrolidinyl]benzene and 4-[N-(2-ethyl)pyrrolidinyl]aniline. A lesser amount of product is realized in the presence of either the cobalt on alumina or the hydrogen bromide on alumina alone.

EXAMPLE VII

In this experiment 108 grams of p-phenylenediamine and 320 grams of tetrahydropyran are added to a rotating autoclave containing a catalyst comprising 10 grams of aqueous hydrogen chloride. The autoclave is equipped with a means of heating and maintenance of superatomspheric pressures by the addition of argon. The autoclave is heated to a temperature of 150° C. while being maintained at a pressure of 20 atmospheres for a period of 4 hours, at which time the autoclave is allowed to return to room temperature and ambient pressure. The product is recovered, separated from the aqueous catalyst and analyzed by means of nuclear magnetic resonance spectroscopy and infra-red spectroscopy instrumentation, which discloses the product to be a mixture containing 1,4-bis-(N-piperidinyl)benzene and 4-(N-piperidinyl)aniline. Duplication of the conditions of this experiment except that the solution of the hydrochloric acid in tetrahydrofuran is first contacted with 50 grams of one-sixteenth inch alumina spheres in a rotating autoclave prior to the addition of the phenylenediamine will result in an increase in the quantity of products formed.

EXAMPLE VIII

In this example 108 grams of p-phenylenediamine and 160 grams of tetrahydropyran are added to a rotating autoclave containing a sulfonic acid substituted on a divinylbenzene-styrene copolymer resin. The autoclave is equipped with a means of heating and maintenance of superatmospheric pressures by the addition of helium. The autoclave is heated to a temperature of 150° C. while being maintained at a pressure of 20 atmospheres for a period of 5 hours, at which time the autoclave is allowed to return to room temperature and ambient pressure. The product is recovered, separated from the sulfonic acid catalyst by filtration and analyzed by means of nuclear magnetic resonance spectroscopy and infra-red spectroscopy instrumentation which disclose the product to be a mixture containing 1,4-bis-(N-piperidinyl)benzene and 4-(N-piperidinyl)aniline.

EXAMPLE IX

Several catalysts were investigated to determine the effectiveness of each in converting a mixture of 9.9 grams of methylenedianiline and 70.6 grams of tetrahydrofuran to desired products. The rotating autoclaves were flushed and the products were found to be a mixture of 4-amino-4'-(N-pyrrolidinyl)diphenylmethane and 4,4'-bis-(N-pyrrolidinyl)diphenylmethane with a conversion of the methylenedianiline in the range of from about 5 mole % to about 100 mole %. The various catalysts which were tested in this particular way were iridium on alumina, iridium on alumina which had been pre-treated with hydrochloric acid, rhodium on alumina, rhodium on alumina which had been treated with hydrochloric acid, rhodium and platinum on alumina, nickel and rhenium on alumina, ruthenium on alumina, cobalt and molybdenum on a mixture of alumina and silica, and platinum and rhenium on an alumina support.

We claim as our invention:

1. A process for the preparation of an N-substituted pyrrolidine or piperidine which comprises reacting a primary amine of one of the structures:

where $R_1$, is selected from the group consisting of $C_1$ to $C_9$ alkyl, pheyl, loweralkylphenyl and loweralkoxyphenyl; or,

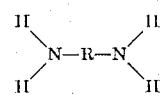

where R is selected from the group $C_2$—$C_6$ alkylene, phenylene, loweralkylphenylene, 4, 4'-diphenyl methyl diradical and 4,4'-dicyclohexyl methyl diradical, with tetrahydrofuran, tetrahydropyran, lower alkyl-substituted tetrahydrofuran or lower alkyl-substituted tetrahydropyran at a temperature in the range of from about 125°C. to about 250°C. and a superatmospheric pressure sufficient to maintain a major portion of the reactants in the liquid phase, said reaction being effected in the presence of an acid-acting catalyst selected from the group consisting of (1) a metal selected from Group VIII of the Periodic Table on a heterogeneous inorganic support of alumina, silica or mixtures thereof and (2) a hydrogen halide, and recovering said N-substituted pyrrolidine or piperidine.

2. The process of claim 1 further characterized in that the primary amine is n-butylamine, the oxygenated heterocyclic compound is tetrahydrofuran and the heterocyclic nitrogen compound is N-n-butylpyrrolidine.

3. The process of claim 1 further characterized in that the primary amine is methylenedianiline, the oxygenated heterocyclic compound is tetrahydrofuran and the heterocyclic nitrogen compounds formed are a mixture of 4-amino-4'-(N-pyrrolidinyl)diphenylmethane and 4,4'-bis-(N-pyrrolidinyl)diphenylmethane.

4. The process of claim 1 further characterized in that the primary amine is n-butylamine, the oxygenated heterocyclic compound is 2-methyltetrahydrofuran and the heterocyclic nitrogen compound is N-n-butyl-2-methylpyrrolidine.

5. The process of claim 1 further characterized in that the primary amine is aniline, the oxygenated heterocyclic compound is ethyl 2-tetrahydrofuroate, and the heterocyclic nitrogen compound is ethyl N-phenylpyrrolidine-2-carboxylate.

6. The process of claim 1 further characterized in that the primary amine is p-phenylenediamine, the oxygenated heterocyclic compound is tetrahydrofuran and the heterocyclic nitrogen compound is a mixture of 1,-4-bis-(N-pyrrolidinyl)benzene and 4-(N-pyrrolidinyl)aniline.

7. The process of claim 1 further characterized in that the primary amine is p-phenylenediamine, the oxygenated heterocyclic compound is tetrahydropyran and the heterocyclic nitrogen compound is a mixture of 1,-4-bis-(N-piperidinyl)benzene and 4-(N-piperidinyl)aniline.

8. The process of claim 1 further characterized in that catalyst (1) also contains a metal selected from the group consisting of molybdenum or rhenium.

9. The process of claim 1 further characterized in that catalyst (1) comprises cobalt composited with an alumina support.

* * * * *